United States Patent
Thottethodi et al.

(10) Patent No.: US 8,935,472 B2
(45) Date of Patent: Jan. 13, 2015

(54) PROCESSING DEVICE WITH INDEPENDENTLY ACTIVATABLE WORKING MEMORY BANK AND METHODS

(71) Applicant: Advanced Micro Devices, Inc., Sunnyvale, CA (US)

(72) Inventors: Mithuna Thottethodi, Bellevue, WA (US); Gabriel Loh, Bellevue, WA (US); Mauricio Breternitz, Austin, TX (US); James O'Connor, Austin, TX (US); Yasuko Eckert, Kirkland, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 201 days.

(21) Appl. No.: 13/723,294

(22) Filed: Dec. 21, 2012

(65) Prior Publication Data
US 2014/0181411 A1    Jun. 26, 2014

(51) Int. Cl.
*G06F 12/00* (2006.01)
*G06F 12/08* (2006.01)

(52) U.S. Cl.
CPC .................................. *G06F 12/0891* (2013.01)
USPC ........... 711/114; 711/104; 711/105; 711/163; 711/165

(58) Field of Classification Search
None
See application file for complete search history.

(56) References Cited

U.S. PATENT DOCUMENTS

2004/0076044 A1* 4/2004 Nowshadi ..................... 365/200

* cited by examiner

*Primary Examiner* — Shawn X Gu
(74) *Attorney, Agent, or Firm* — Volpe and Koenig, P.C.

(57) ABSTRACT

A data processing device is provided that includes an array of working memory banks and an associated processing engine. The working memory bank array is configured with at least one independently activatable memory bank. A dirty data counter (DDC) is associated with the independently activatable memory bank and is configured to reflect a count of dirty data migrated from the independently activatable memory bank upon selective deactivation of the independently activatable memory bank. The DDC is configured to selectively decrement the count of dirty data upon the reactivation of the independently activatable memory bank in connection with a transient state. In the transient state, each dirty data access by the processing engine to the reactivated memory bank is also conducted with respect to another memory bank of the array. Upon a condition that dirty data is found in the other memory bank, the count of dirty data is decremented.

20 Claims, 3 Drawing Sheets

PROCESSING DEVICE WITH INDEPENDENTLY ACTIVATABLE WORKING MEMORY BANK AND METHODS

FIELD

The disclosed embodiments are generally directed to data processing devices that include banks of working memory, such as cache or scratchpad memory and, in particular, to facilitating independent deactivation and activation of working memory banks.

BACKGROUND

Data processing devices that employ arrays of working memory banks, such as cache or scratchpad memory bank arrays, are well known in the art. The availability of such working memory enables a processing engine of the processing device to temporarily access and store data for calculations and other work in progress in an efficient manner. Generally, this avoids having to await retrieval of data during the particular processing operation from a main memory or other source and also avoids having to store intermediate results of a particular processing operation to main memory.

When data is accessed in a working memory by a processing engine, it may be modified during a processing operation such that it may no longer reflect the contents of the main memory or other source where it had been retrieved. Conventionally, this results in the working memory containing both "clean" and "dirty" data entries where a clean data entry accurately reflects the contents of main memory or other source as originally retrieved and where a dirty data entry may not. A flag may be set with respect to a particular data entry or block of data entries indicating that the entry or block contains clean or dirty data.

After a processing operation or a series of processing operations have been completed, some or all of the working memory may be cleared for further use in subsequent operations. In such cleaning of the working memory, generally clean data entries are discarded and dirty data entries are written to main memory so that the main memory is updated with the results of the processing operations that had been performed. In some instances, the dirty data entries may also be discarded such as when they represent intermediate results remaining after completion of a processing operation.

Working memory may generally be employed with any type of data processing device, including, but not limited to, a central processing unit (CPU), a graphics processing unit (GPU), and an accelerated processing unit (APU). Often such processing devices are incorporated into battery powered units where power conservation is an important consideration in extending battery life for a particular device.

SUMMARY OF EXEMPLARY EMBODIMENTS

A data processing device is provided that includes an array of working memory banks, such as a cache array or multi-bank scratchpad memory, that is used by a processing engine. The working memory bank array is configured with at least one independently activatable memory bank such that the independently activatable memory bank can be deactivated while at least one other memory bank remains active in conjunction with migrating any dirty data contained in the independently activatable memory bank to one or more active banks in the array.

In some embodiments, a dirty data counter (DDC) is associated with the independently activatable memory bank and is configured to reflect a count of dirty data migrated from the independently activatable memory bank upon selective deactivation of the independently activatable memory bank. In some embodiments, the DDC is configured to selectively decrement the count of dirty data upon the reactivation of the independently activatable memory bank in connection with a transient state.

In the transient state, each access for dirty data by the processing engine to the reactivated memory bank is also conducted with respect to another memory bank of the array and, upon a condition that the dirty data is found in the other memory bank, the count of dirty data is decremented. In some embodiments, all data accesses by the processing engine bank in the transient state to the reactivated memory are also conducted with respect to another memory bank of the array and, upon a condition that the data is found in the other memory bank and is dirty, the count of dirty data is decremented.

In some embodiments, the DDC is also configured to selectively adjust the count of dirty data before reactivation of the independently activatable memory bank. In some embodiments, the count is incremented on a condition that new dirty data for data addresses normally accessed from the independently activatable memory bank is created. In some embodiments, the count is decremented on a condition that dirty data migrated from the independently activatable memory bank or new dirty data that incremented the count is written to a main memory or is otherwise eliminated as dirty data.

In some embodiments, the processing device is configured to migrate, write to the main memory or otherwise eliminate dirty data in connection with decrementing the count during the transient state and to exit the transient state when the count in the DDC is decremented to zero (0) at which time the processing device functions in a stable state.

A backstop timer may be provided to provide a time limit to the duration of the transient state. In such case, the time is set upon reactivation of the memory bank and will cause the processing device to exit the transient state after a selected duration of time has expired, unless the transient state has already been exited from due to the count in the DDC being decremented to zero (0).

The processing device may be configured to conduct a stall, walk, and migrate process in connection with the reactivation of an independently deactivated working memory bank. In the stall step, all accesses to the working memory by the processing engine are suspended. In the walk step, the active memory banks are walked to identify dirty data that should be migrated to the reactivated memory bank. In the migrate step, the identified dirty data is migrated, i.e. transferred, to the reactivated memory bank. In some embodiments, the walk and migrate step are combined so that dirty data is migrated as soon as it is identified. Once the walk and migrate steps are complete, the stall process stops and accesses to the working memory by the processing engine are resumed and the processing device continues in the stable state.

The processing device can be configured to conduct the stall, walk, and migrate process when the transient state is exited from as a result of the expiration of the time limit set by the backstop timer. Although not preferred, the processing device may be configured to conduct the stall, walk, and migrate process when reactivating an independently deactivated working memory bank instead of entering the transient state. However, utilizing the transient step can provide superior performance of the processing device.

The data processing device may be configured to conduct a walk migrate process in connection with the transient state. In one example of such a case, active working memory banks are walked to identify dirty data that remains to be migrated to the reactivated working memory bank, written to the main memory or otherwise eliminated as dirty data. Identified dirty data is migrated to the reactivated memory bank, written to the main memory or otherwise eliminated as dirty data. The DDC count is decremented for each identified dirty data migrated to the reactivated memory bank, written to the main memory or otherwise eliminated as dirty data. The walk migrate process aids in accelerating the decrementing of the DDC count to 0 and, accordingly, the exiting of the transient state.

A non-transitory computer-readable storage medium storing a set of instructions for execution by a general purpose computer to facilitate manufacture of an integrated circuit that includes a selectively configured processing component. In some embodiments, such processing component has an array of working memory banks associated with a processing engine and a dirty data counter (DDC) associated with an independently activatable memory bank within the array. The DDC configured to reflect a count of dirty data migrated from the independently activatable memory bank upon selective deactivation of the independently activatable memory bank. The DDC configured to selectively decrement the count of dirty data upon the reactivation of the independently activatable memory bank in connection with a transient state wherein each access for dirty data by the processing engine to the independently activatable memory bank is also conducted with respect to another memory bank of the array and upon a condition that the dirty data is found in the other memory bank, the count of dirty data is decremented.

In some embodiments, the non-transitory computer-readable storage medium contains instructions that are hardware description language (HDL) instructions used for the manufacture of a device.

BRIEF DESCRIPTION OF THE DRAWINGS

A more detailed understanding may be had from the following description, given by way of example in conjunction with the accompanying drawings.

DETAILED DESCRIPTION

Data processing device are ubiquitous today and are incorporated to into a vast number of different types of products. Often it is desirable to save energy by powering down selected component of a product when not in use. For battery operated devices, this can serve to preserve battery life. However, efficient mechanisms for efficiently reactivating components are desirable to maintain a high level of performance of the processing device.

Generally, working memory bank arrays of processing devices have been configured to be activated and deactivated as a whole. There is a balance between power saving and performance within a processing device so that independent powering down of individual banks of working memory may not be desirable without some associated performance benefits.

Figure 1:
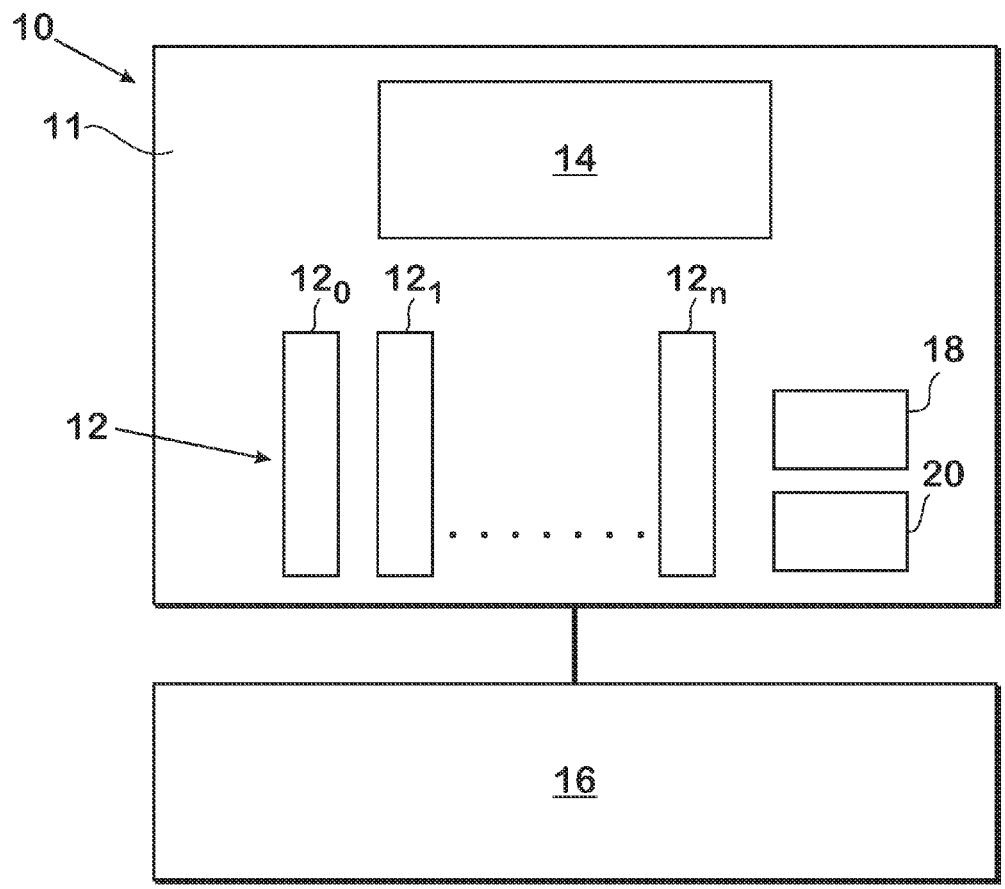
FIG. 1 is a block diagram of a processing device in which one or more disclosed embodiments may be implemented.

Referring to FIG. 1, an example data processing device 10 is illustrated having a processing component 11 that includes an array 12 of memory banks $12_0, 12_1\text{-}12_n$, that serve as working memory, such as cache or scratchpad memory, for a processing engine 14. Although multiple memory banks $12_0, 12_1, \ldots 12_n$, are illustrated, the array 12 may consist of only two memory banks.

Generally, the processing component 11 is configured to utilize the working memory banks is a systematic manner. For example, when there are only two memory banks $12_0, 12_1$, in the working memory array 12, the processing component 11 may be configured to utilize the first memory bank $12_0$ for even data addresses and the second memory bank $12_1$ for odd data addresses The example processing device 10 also includes a main memory 16 coupled to the processing component 11. In operation, data from the main memory 16, or another source (not shown) is loaded into the working memory bank array 12. The processing engine 14 then operates by using the data loaded into the working memory array 12 to perform calculations or other functions. This entails the processing engine 14 both reading data from and writing data to the working memory bank array 12 to produce processed data results that are then written back to the main memory 16 or to an otherwise desired location. In some cases, data in the working memory 12 is simply discarded, such that data directed to interim results not intended to be returned to the main memory or data that was not utilized by the processing engine 14.

When data is loaded into the working memory bank array 12 before the processing engine uses it, it is commonly referred to as "clean." Once, data elements stored in the array are modified by the processing engine 14, they are considered "dirty" since the data value may change as a result of the operation of the processing engine. It is known in the art to set a flag indicating whether certain data is clean or dirty, generally based upon whether or not the processing engine has modified the data.

It is possible to keep track of the clean or dirty status of each bit of data loaded into the working memory. In some embodiments, however, a memory block size is defined and the "clean" and "dirty" data designations are used on a blockwise basis such that before the processing engine 14 modifies any data within a particular block, the block is denoted as clean and after the processing engine 14 modifies any data within a particular block, the block is denoted as dirty.

In accordance with some embodiments, at least one of the memory banks $12_0, 12_1, \ldots 12_n$, of the working memory array 12 is configured to be independently activatable, i.e. deactivated and activated independent of other memory banks in the array. Generally, deactivation is a powering down of the bank and activation is a powering up of the bank. In some embodiments, the independently activatable memory bank can be deactivated while at least one other memory bank remains active so that the processing engine 14 can still proceed to operate, albeit with a lesser amount of working memory available.

In order for the processing engine 14 to successfully complete operations in progress after the deactivation of a bank of working memory, the processing engine 14 will generally still need to have access to the data in the memory bank that was deactivated. With respect to clean data, that data can generally be retrieved from the main memory 16 and stored in one of the working memory banks remaining active, or simply transferred, i.e. migrated, from the working memory bank being deactivated thereto. With respect to dirty data, however, that data cannot generally be retrieved from the main memory 16, since the dirty data may not be the same as the original data that had been loaded.

Accordingly, the memory bank array 12 is configured to migrate dirty data, upon deactivation of a selected memory bank, from that memory bank to one of the working memory banks remaining active. Where the dirty data is no longer needed for processing, such as where it reflects a completed processing result, instead of migrating that data, it may be stored to the main memory 16.

In some embodiments, the memory bank array 12 is configured to deal with data designation and migration on a data block basis such that the clean and dirty data designations are applied to data blocks within the individual memory banks and the migration of data is done on a block basis.

The working memory array 12 is configured to be able to independently reactivate a deactivated independently activatable memory bank such that the processing engine 14 can continue to process work in progress with a restored amount of working memory available. When reactivation of a deactivated independently activatable working memory bank occurs, in order for the processing engine 14 to efficiently complete operations in progress, it is generally desirable to restore previously migrated dirty data to the reactivated memory bank. Additionally, further dirty data may have been created during the period when the independently activatable working memory bank was deactivated for data addresses that are normally resident in that bank for which migration is also desired when the bank is reactivated.

For example, consider the case where there are only two memory banks $12_0, 12_1$, in the working memory array 12 and the processing component 11 is configured to utilize the first memory bank $12_0$ for even data addresses and the second memory bank $12_1$ for odd memory addresses when both banks are activated. Where the second memory bank $12_1$ is independently activatable, the deactivation of the second memory bank $12_1$ will be performed in connection with migrating or transferring to main memory all dirty data for odd memory addresses to the first memory bank $12_0$. The processing engine then continues processing operations utilizing the active first memory bank $12_0$ for all data addresses in the working memory. During the continuing operation, while the second memory bank $12_1$ is deactivated, some of the migrated dirty data with respect to odd addresses may be evicted to main memory and some clean data in odd addresses may become dirty. Upon reactivation of the second memory bank $12_1$, it is then desirable to migrate any remaining dirty data from odd addresses back to the second memory bank $12_1$ along with any new dirty data for odd addresses so that the processing engine 14 can resume normal operations utilizing the first memory bank $12_0$ for even data addresses and the second memory bank $12_1$ for odd memory addresses.

In some embodiments, a dirty data counter (DDC) 18 is provided that is associated with the independently activatable memory bank. In some embodiments, the DDC is configured to reflect a count of dirty data migrated from the independently activatable memory bank upon its selective deactivation. In one example, where the designation of clean and dirty data is performed on a block basis, the DDC similarly is configured to keep count of dirty data on a block basis.

In some embodiments, the DDC is configured to selectively decrement the count of dirty data upon the reactivation of the independently activatable memory bank in connection with a transient state of processing device 10. In the transient state, each access for dirty data by the processing engine 14 to the reactivated working memory bank is also conducted with respect to another working memory bank of the array 12 and, upon conditions that the dirty data is found in the other memory bank, the count of dirty data in the DDC 18 is decremented. Generally in connection with the access to dirty data in another bank, the dirty data is migrated to the reactivated bank. In some cases, however, it may be written to main memory or otherwise eliminated as dirty data instead. The transient state may include duel data accesses to clean data, in which case if the clean data is found in another bank, it can be migrated to the reactivated bank.

As noted above, the continued data processing during the period of deactivation will generally result in changes in the status of dirty data. Accordingly, in some embodiments, the DDC is configured to selectively increment the count of dirty data before the reactivation of the independently activatable memory bank, whenever new dirty data for data addresses normally accessed from the independently activatable memory bank is created. In some embodiments, the DDC 18 is also configured to selectively decrement the count of dirty data before the reactivation of the independently activatable memory bank, whenever dirty data migrated from the independently activatable memory bank or new dirty data that incremented the count is written to a main memory or is otherwise eliminated as dirty data.

In some embodiments, the processing device 10 is configured to exit the transient state when the count in the DDC is decremented to zero (0) at which time the processing device 10 functions in a stable state.

A backstop timer 20 may be provided to provide a time limit to the duration of the transient state. In such case, the timer 20 is set upon reactivation of the memory bank such that it will cause the processing device 10 to exit the transient state after a selected duration of time has expired, unless the transient state has already been exited from due to the count in the DDC being decremented to zero (0). Alternatively, a walk migrate process can be conducted during the transient state such as discussed in connection with FIG. 4 below.

The processing device 10 may be configured to be able to conduct a stall, walk, and migrate process in connection with the reactivation of an independently deactivated working memory bank. In the stall step, all accesses to the working memory 12 by the processing engine 14 are suspended. In the walk step, the active working memory banks are walked to identify dirty data that should be migrated to the reactivated working memory bank. In the migrate step, the identified dirty data is migrated, i.e. transferred, to the reactivated memory bank. In some embodiments, the walk and migrate step are combined so that dirty data is migrated as soon as it is identified. Once the walk and migrate steps are complete, the stall process stops and accesses to the working memory by the processing engine are resumed and the processing device continues in the stable state.

The processing device 10 may be configured to conduct the stall, walk, and migrate process when the transient state is exited from as a result of the expiration of the time limit set by the backstop timer. Although not preferred, the processing device may be configured to conduct the stall, walk, and migrate process when reactivating an independently deactivated working memory bank instead of entering the transient state. However, utilizing the transient step can provide superior performance of the processing device. Also to avoid using a stall altogether, the transient state can include a concurrent walk migrate process.

Figure 2:
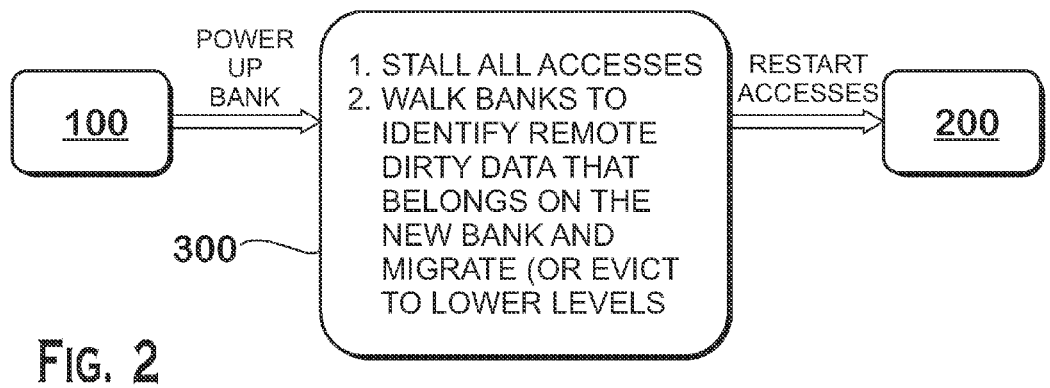
FIG. 2 is a combined state diagram and flowchart of a method for reactivating an independently deactivated working memory bank in which one or more disclosed embodiments may be implemented.
Figure 3:
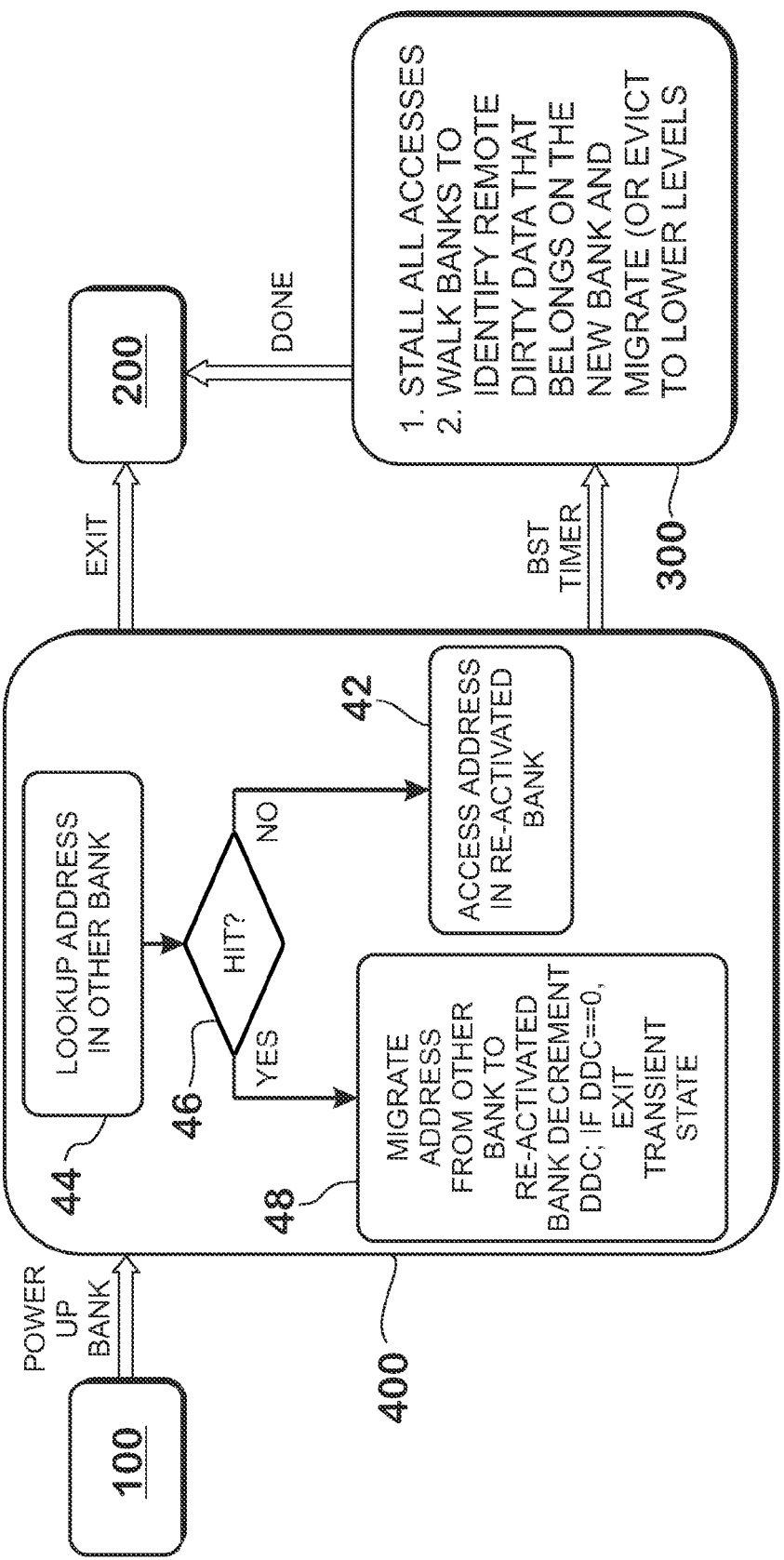
FIG. 3 is another combined state diagram and flowchart of another method for reactivating an independently deactivated working memory bank in which one or more disclosed embodiments may be implemented.
Figure 4:
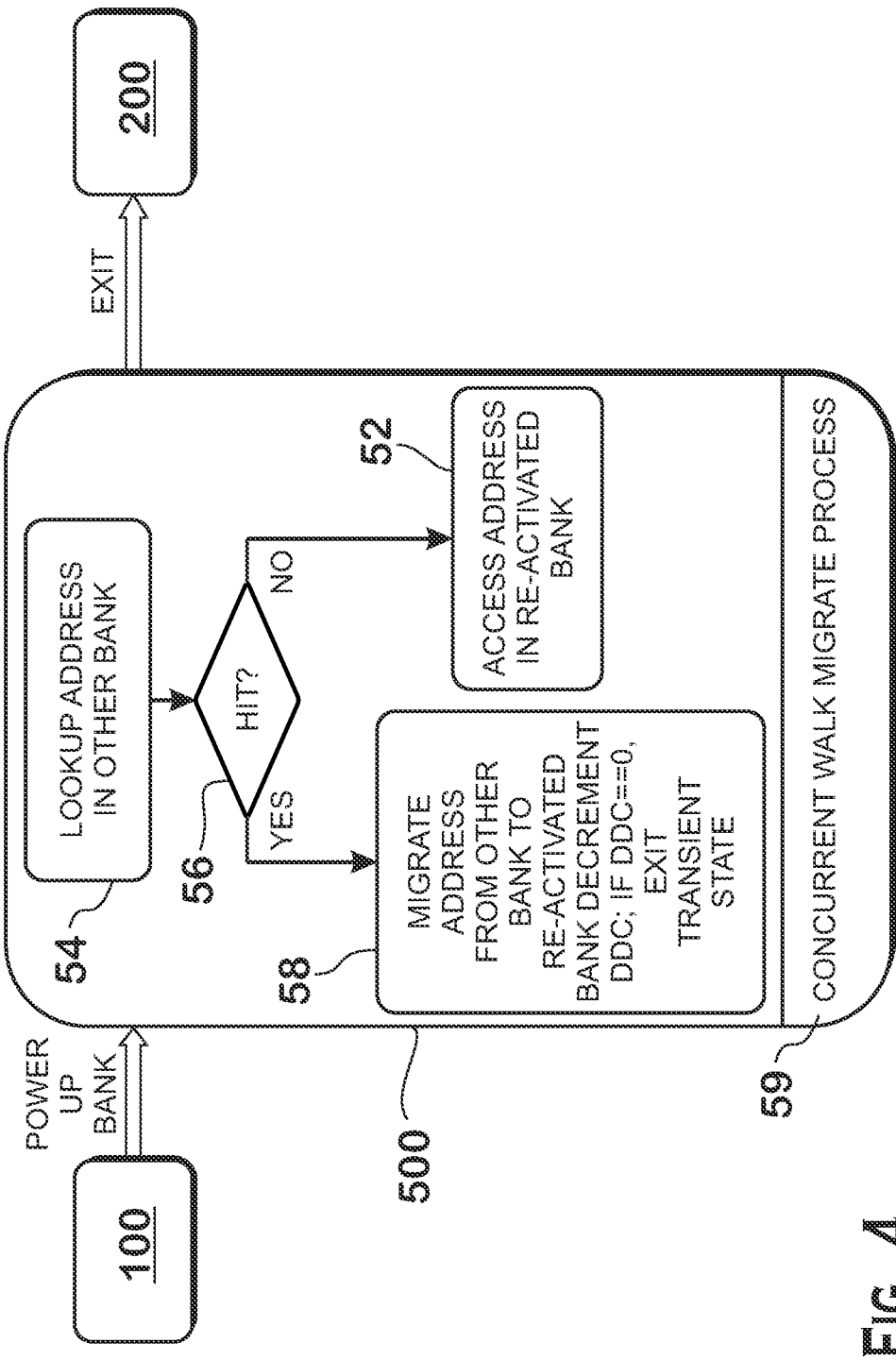
FIG. 4 is a further combined state diagram and flowchart of a further method for reactivating an independently deactivated working memory bank in which one or more disclosed embodiments may be implemented.

Referring to FIGS. 2, 3 and 4, diagrams are provided of three non-limiting examples for transitioning the processing device 10 from a reduced memory processing state 100 to the stable state 200. In the reduced memory processing state 100, no accesses are made to the deactivated working memory bank by the processing engine 14. In the stable state 200, the accesses to the reactivated working memory bank by the processing engine 14 proceed in a normal fashion, i.e. in a manner comparable to accesses to the reactivated memory bank before independent deactivation.

FIG. 2 illustrates a process where the transient state is not implemented and only the stall, walk, and migrate process is utilized. In accordance with FIG. 2, power is restored to reactivate the deactivated memory bank and the stall, walk, and migrate process 300 is conducted. In some embodiments, this is performed in a first step of stalling all accesses to the working memory 12 by the processing engine 14 and a second combined step of walking and migrating dirty data back to the memory bank that is being reactivated. In some instances, the walking may determine that dirty data is not needed to be restored to the reactivated memory bank. In such case, the dirty data may be evicted to main memory instead of being migrated back to the reactivated memory bank. After conclusion of the second step, the stall step is discontinued such that accesses are resumed by the processing engine to the working memory including to the reactivated working memory bank.

FIG. 3 illustrate the process where the transient state is implemented in connection with the use of the DDC and backstop timer. In accordance with FIG. 3, power is restored to reactivate the deactivated memory bank and transient state 400 is entered.

In the transient state 400, the processing engine 14 begins to attempt to access data in the reactivated working memory bank at a given address as indicated at step 42. First or in conjunction with an access 42 of data in the reactivated memory bank, the processing engine 14 attempts to access the data in another memory bank as it would have continued to do in the reduced memory processing state 100 as indicated at step 44.

At step 46, a determination is made whether or not the data address was found in one of the other memory banks. This determination will be negative, where the data has already been migrated to the reactivated memory bank. Accordingly, in such case, the processing engine will successfully find the address and data in the reactivated memory as indicated by step 42. As noted above, steps 42 and 44 can be started concurrently to shorten the process.

Where the processing engine 14 at step 46 finds the data address in one of the other memory banks, it uses the data and the address and associated data are migrated to the reactivated memory bank per step 48. Where the data is dirty, the DDC decrements the dirty data count and the transient state is exited if the resultant count has reached zero.

In connection with the start of the transient state 400, the backstop timer (BST) is started to set a maximum time limit to the duration of the transient state. If the transient state has not been exited from when the set BST time expires, the stall, walk, and migrate process 300 is conducted to transition the processing device to the stable state 200. In such case, the time for completing the stall, walk, and migrate process 300 will be reduced commensurate with the number of items that had been migrated to the reactivated memory bank during the transient state.

The timer-driven exit employing the stall, walk, and migrate process does not significantly impair the benefits obtained from implementing the transient state. Generally, it is unlikely that the timer-driven exit will be the common exit mechanism because of the following two reasons. If the dirty data is accessed, the data is migrated as described. If the dirty data is not accessed, there is a high likelihood of the block having been evicted because of replacement policies that penalize least-recently used data blocks. In either case, the data migration or eviction causes the DDC to be decremented. If the timer is set to a value that is larger than the typical lifetime of a block in the working memory, then one may expect that eviction of all dirty data that has not been migrated before the backstop timer times out is the common case.

In some embodiments, if the processing device 10 wants to power up an additional bank or power down a bank while still in the transient mode, it will wait for the completion of the stall, walk, and migrate step at the expiration of the backstop timer. Alternatively, the processing device 10 may immediately initiate the stall, walk, and migrate step either by forcing the backstop timer into an expired state, or directly triggering the stall, walk, and migrate process and resetting the backstop timer.

The transient mode of operation incurs the additional cost of checking each access in two banks, the reactivated bank and another bank. As noted above, these accesses can proceed in parallel. Thus, while there is a power-cost, there is no significant performance cost. Even this cost of duplicate lookup may be filtered by using a Bloom filter or similar data structures that contains a signature of DDC block addresses. In such an embodiment, while in the transient state 400, each access would first check the signature to see if the address could possibly be in the dirty data set. If so, the address is looked up in both the reactivated bank and another bank. If not, the access may proceed directly to the reactivated bank. Because there are no false negatives with Bloom filters, no dirty data will be missed. However, false-positives in the Bloom filter may require some duplicate lookups in another bank.

Compared to a baseline in which all accesses result in duplicate accesses, the Bloom filter approach may significantly reduce the number of duplicate accesses. The use of a counting Bloom filter may further reduce duplicate accesses by removing migrated/evicted data from the Bloom signature, thus reducing the power overhead.

In a variation of the example illustrated in FIG. 3, the backstop timer may be replaced or augmented with a look up counter that tracks the number of extraneous bank lookups, i.e., cases where a request requires looking up in both the reactivated bank and another bank. When this count exceeds a threshold, then the stall, walk and migrate process can be initiated to transition to the stable state 200. The advantage of this approach is that it provides a guaranteed bound on the bandwidth overhead of additional lookups while in the transient state. In general, the stall, walk and migrate process may be initiated by any counter-based triggering event.

As reflected in FIG. 4, some embodiments may dispense with the backstop timer or other triggering mechanisms altogether. In the example illustrated in FIG. 4, a modified transient state 500 is employed to transition from the reduced memory processing state 100 to the stable state 200. In the modified transient state 500, the processing engine 14 also begins to attempt to access data in the reactivated working memory bank at a given address as indicated at step 52. First or in conjunction with an access 52 of data in the reactivated memory bank, the processing engine 14 also attempts to access the data in another memory bank as it would have continued to do in the reduced memory processing state 100 as indicated at step 54.

At step 56, a determination is also made whether or not the data address was found in one of the other memory banks.

This determination will be negative, where the data has already been migrated to the reactivated memory bank. Accordingly, in such case, the processing engine will successfully find the address and data in the reactivated memory as indicated by step 52. As noted above, steps 52 and 54 can be started concurrently to shorten the process.

Where the processing engine 14 at step 56 finds the data address in one of the other memory banks, it uses the data and the address and associated data are migrated to the reactivated memory bank per step 58. Where the data is dirty, the DDC decrements the dirty data count and the transient state is exited if the resultant count has reached zero.

Unlike the transient state 400, upon entering the modified transient state 500, a combined walk migrate process 59 is initiated in order to accelerate the time taken to decrement the DDC to zero. In the combined walk migrate process, the addresses for the reactivated data bank that are contained in other data banks of array 12 are walked to identify data and to migrate it to the memory bank that is being reactivated. In some instances, the walking may determine that dirty data is not needed to be restored to the reactivated memory bank. In such case, the dirty data may be evicted to main memory instead of being migrated back to the reactivated memory bank. Whenever dirty data is identified, whether it is migrated or evicted, the DDC is decremented and the transient state is exited if the resultant count has reached zero.

The combined walk migrate process 59 may be conducted by only walking dirty data addresses such as where a dirty data flag has been set. Optionally, the walk migrate process can also include data addresses irrespective of whether the data is clean or dirty to migrate clean data into the reactivated data bank as well. In such case, however, it is preferred to still exit the transient state 500 when the DDC count reaches zero and to orphan unmigrated clean data in the other memory banks. Clean data not migrated will need to be reloaded into the reactivated memory bank from the main memory 16 or other source if it is needed for further processing by the processing engine 14. Additionally, it may be desirable to employ bloom filtering with respect to the modified transient state 500 as discussed above with respect to the transient state 400.

In some embodiments, where more than one of the working memory banks $12_0$, $12_1$, ... $12_n$, of the array 12 are independently activatable, the DDC is configured to keep an independent count with respect to each independently activatable memory bank. Alternatively, a separate DDC may be provided with respect to each independently activatable memory bank. Since generally at least one working memory bank needs to remain active for the processing engine to function, the processing device may be configured with one working memory bank, for example bank $12_0$, not being independently activatable and the remaining working memory banks $12_1$, ... $12_n$ of the array 12 being independently activatable. However, all of the working memory banks $12_0$, $12_1$, ... $12_n$, of the array 12 could be configured to be independently activatable. In such case, the array 12 is configured to permit the independent deactivation of a memory bank only on a condition that one other memory remains active.

In some embodiments, the backstop timer 20 is associated with all of the independently activatable working memory banks. In the case in which more than one bank is reactivated concurrently, exit from the transient state occurs when the backstop timer elapses or when the DDC count with respect to all of the banks being reactivated reach zero. Where the backstop timer or the like is not used, such as the case illustrated in FIG. 4, exit from the transient state in the context of multiple bank concurrent reactivation occurs when the DDC count with respect to all of the banks being reactivated reach zero.

The processing component 11 of the data processing device 10 may include a central processing unit (CPU), a graphics processing unit (GPU), a CPU and GPU located on the same die, or one or more processor cores, wherein each processor core may be a CPU or a GPU. The memory 16 may be located on the same die as the processing component 11, or may be located separately.

It should be understood that the methods described herein may be implemented in a CPU, a GPU, an APU, or any other processor that uses working memory and that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including net lists (such instructions capable of being stored on a computer readable media). The results of such processing may be mask works that are then used in a semiconductor manufacturing process to manufacture a processor which implements aspects of the disclosed embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A data processing device comprising:
   an array of working memory banks associated with a processing engine;
   a dirty data counter (DDC) associated with an independently activatable memory bank within the array;
   the DDC configured to reflect a count of dirty data migrated from the independently activatable memory bank upon selective deactivation of the independently activatable memory bank; and
   the DDC configured to selectively decrement the count of dirty data upon reactivation of the independently activatable memory bank in connection with a transient state wherein each access for dirty data by the processing engine to the independently activatable memory bank is also conducted with respect to another memory bank of the array and, upon a condition that dirty data accessed by the processing engine is found in the other memory bank, the count of dirty data is decremented.

2. The data processing device of claim 1 wherein the data processing device is configured to identify dirty data on a block basis and the DDC is configured to count blocks of dirty data.

3. The data processing device of claim 1 wherein the DDC is configured to selectively adjust the count of dirty data before reactivation of the independently activatable memory bank such that:
  the count is incremented on a condition that new dirty data for data addresses normally accessed from the independently activatable memory bank is created, and
  the count is decremented on a condition that dirty data migrated from the independently activatable memory bank or new dirty data that incremented the count is written to a main memory or is otherwise eliminated as dirty data.

4. The data processing device of claim 3 configured to migrate, write to the main memory or otherwise eliminate dirty data in connection with decrementing the count during the transient state and to exit the transient state when the count in the DDC is decremented to zero (0).

5. The data processing device of claim 4 further comprising a backstop timer configured to provide a time limit to a duration of the transient state.

6. The data processing device of claim 5 configured to selectively conduct a stall, walk, and migrate process in connection with the reactivation of the independently deactivated working memory bank such that:
  in the stall step, all accesses to the working memory banks by the processing engine are suspended;
  in the walk step, active working memory banks are walked to identify dirty data that should be migrated to the reactivated working memory bank; and
  in the migrate step, the identified dirty data is migrated to the reactivated memory bank; and
  resume accesses to the working memory banks by the processing engine thereafter including accesses to the reactivated memory bank.

7. The data processing device of claim 6 configured to conduct the stall, walk, and migrate process when the transient state is exited from as a result of the expiration of a time limit set by the backstop timer.

8. The data processing device of claim 4 configured to conduct a walk migrate process in connection with the transient state such that:
  active working memory banks are walked to identify dirty data that remains to be migrated to the reactivated working memory bank, written to the main memory or otherwise eliminated as dirty data;
  the identified dirty data is migrated to the reactivated memory bank, written to the main memory or otherwise eliminated as dirty data; and
  the DDC count is decremented for each identified dirty data migrated to the reactivated memory bank, written to the main memory or otherwise eliminated as dirty data.

9. The data processing device of claim 1 wherein:
  a plurality of the working memory banks of the array are independently activatable; and
  the DDC is configured to keep an independent count with respect to each independently activatable memory bank.

10. A method of data processing comprising:
  providing a processing component having a processing engine associated with an array of working memory banks that includes an independently activatable memory bank;
  establishing a dirty data count that reflects dirty data migrated from the independently activatable memory bank upon selective deactivation of the independently activatable memory bank; and
  selectively decrementing the dirty data count upon reactivation of the independently activatable memory bank in connection with a transient state wherein each access for dirty data by the processing engine to the independently activatable memory bank is also conducted with respect to another memory bank of the array and upon a condition that dirty data accessed by the processing engine is found in the other memory bank, the count of dirty data is decremented.

11. The data processing method of claim 10 wherein dirty data is identified on a block basis and the dirty data count is with respect to blocks of dirty data.

12. The data processing method of claim 11 including selectively adjusting the count of dirty data before reactivation of the independently activatable memory bank such that:
  the count is incremented on a condition that new dirty data for data addresses normally accessed from the independently activatable memory bank is created, and
  the count is decremented on a condition that dirty data migrated from the independently activatable memory bank or new dirty data that incremented the count is written to a main memory or is otherwise eliminated as dirty data.

13. The data processing method of claim 12 wherein dirty data is migrated, written to the main memory or otherwise eliminated in connection with decrementing the count during the transient state and the transient state is exited when the dirty data count is decremented to zero (0).

14. The data processing method of claim 13 further comprising providing a time limit for a duration of the transient state.

15. The data processing method of claim 14 including:
  selectively conducting a stall, walk, and migrate process in connection with the reactivation of the independently deactivated working memory bank such that:
    in the stall step, all accesses to the working memory banks by the processing engine are suspended;
    in the walk step, active working memory banks are walked to identify dirty data that should be migrated to the reactivated working memory bank; and
    in the migrate step, the identified dirty data is migrated to the reactivated memory bank; and
  resuming accesses to the working memory banks by the processing engine thereafter including accesses to the reactivated memory bank.

16. The data processing method of claim 15 wherein the stall, walk, and migrate process is conducted when the transient state is exited from as a result of the expiration of a time limit.

17. The data processing method of claim 10 where a plurality of the working memory banks of the array are independently activatable wherein an independent dirty data count with respect to each independently activatable memory bank is performed for each deactivated memory bank.

18. The data processing method of claim 13 including conduct a walk migrate process in connection with the transient state such that:
  active working memory banks are walked to identify dirty data that remains to be migrated to the reactivated working memory bank, written to the main memory or otherwise eliminated as dirty data;
  the identified dirty data is migrated to the reactivated memory bank, written to the main memory or otherwise eliminated as dirty data; and the DDC count is decremented for each identified dirty data migrated to the reactivated memory bank, written to the main memory or otherwise eliminated as dirty data.

19. A non-transitory computer-readable storage medium storing a set of instructions for execution by a general purpose computer to facilitate manufacture of an integrated circuit that includes:
  a processing component having:
    an array of working memory banks associated with a processing engine;
    a dirty data counter (DDC) associated with an independently activatable memory bank within the array;
    the DDC configured to reflect a count of dirty data migrated from the independently activatable memory bank upon selective deactivation of the independently activatable memory bank; and
    the DDC configured to selectively decrement the count of dirty data upon reactivation of the independently activatable memory bank in connection with a transient state wherein each access for dirty data by the processing engine to the independently activatable memory bank is also conducted with respect to another memory bank of the array and upon a condition that dirty data accessed by the processing engine is found in the other memory bank, the count of dirty data is decremented.

20. The non-transitory computer-readable storage medium of claim 19, wherein the instructions are hardware description language (HDL) instructions used for manufacture of a device.

* * * * *